US005796970A

United States Patent [19]

Higaki et al.

[11] Patent Number: 5,796,970
[45] Date of Patent: Aug. 18, 1998

[54] INFORMATION PROCESSING APPARATUS FOR REALIZING DATA TRANSFER FOR A PLURALITY OF REGISTERS USING INSTRUCTIONS OF SHORT WORD LENGTH

[75] Inventors: Nobuo Higaki, Osaka; Nobuki Tominaga, Kyoto; Shinya Miyaji, Hirakata; Shuichi Takayama, Takarazuka, all of Japan

[73] Assignee: Matsushita Electric Industrisl Co., Ltd., Osaka, Japan

[21] Appl. No.: 716,946

[22] Filed: Sep. 20, 1996

[30] Foreign Application Priority Data

Sep. 22, 1995 [JP] Japan ................... 7-244757

[51] Int. Cl.$^6$ ................... G06F 9/345
[52] U.S. Cl. ................... 395/376; 395/569
[58] Field of Search ................... 395/569, 376

[56] References Cited

U.S. PATENT DOCUMENTS

| | | | |
|---|---|---|---|
| 4,109,310 | 8/1978 | England et al. | 395/590 |
| 4,241,399 | 12/1980 | Strecker et al. | 364/200 |
| 4,338,663 | 7/1982 | Strecker et al. | 364/200 |
| 4,733,346 | 3/1988 | Tanaka | 364/200 |
| 5,414,864 | 5/1995 | Koizumi et al. | 395/775 |
| 5,440,757 | 8/1995 | Yoshida | 395/800 |
| 5,491,826 | 2/1996 | Koino | 395/775 |
| 5,517,664 | 5/1996 | Watanabe et al. | 395/800 |
| 5,680,568 | 10/1997 | Sakamura | 711/220 |

FOREIGN PATENT DOCUMENTS 310129 of 0000 Japan .

OTHER PUBLICATIONS

Enhanced 32-bit microprocessor user's manual, Motorola, pp. 3-120_3-122, 1989.

*Primary Examiner*—Parshotam S. Lall
*Assistant Examiner*—Saleh Najjar
*Attorney, Agent, or Firm*—Price, Gess & Ubell

[57] ABSTRACT

An information processing apparatus for executing a program, the apparatus including: a register set made up of a plurality of registers; a decoding unit for decoding machine language instructions in the program and extracting a selected instruction which indicates data transfer between a plurality of registers designated by a first operand, which is made up of a single field of at least one bit which shows whether an individual register out of the register set is designated and a group field which shows whether a plurality of other registers out of the register set are designated as a group, and consecutive addresses of memory designated by a second operand as an effective address of memory; a determining unit for determining whether each bit in the single field and group field of the first operand of the extracted machine language instruction is valid; a first generating unit for generating a register number for a register corresponding to a bit determined as being valid in the single field, a second generating unit for generating in order a register number of each register to which the group field relates, when a bit in the group field has been determined as being valid; and a transferring unit for executing data transfer between the registers identified by the register numbers generated by the first generating unit and the second generating unit and the consecutive memory areas starting from the effective address.

25 Claims, 16 Drawing Sheets

MOVM regs, ⟨ea⟩ : Block Transfer from a plurality of Registers to Consecutive Areas of the Memory MOVM ⟨ea⟩, regs : Block Transfer from Consecutive Areas of the Memory to a plurality of Registers op code
⟨ea⟩ : effective address (uses stack pointer (SP) )
regs : register designating field register designating field bit0 : Not used
bit : Group designating field for R0−R9
bit7−bit2 : Single register designating field for R10−R15

D0~D7:Data Registers
A0~A7:Address Registers

Fig. 2
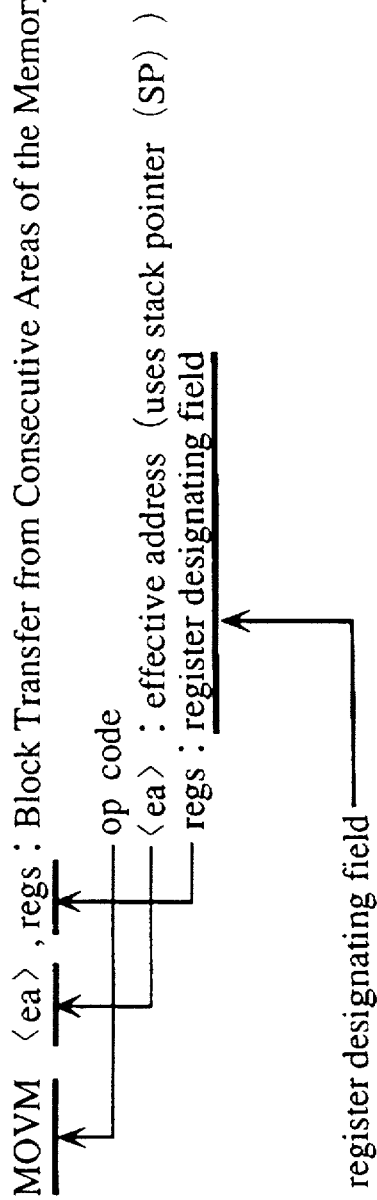
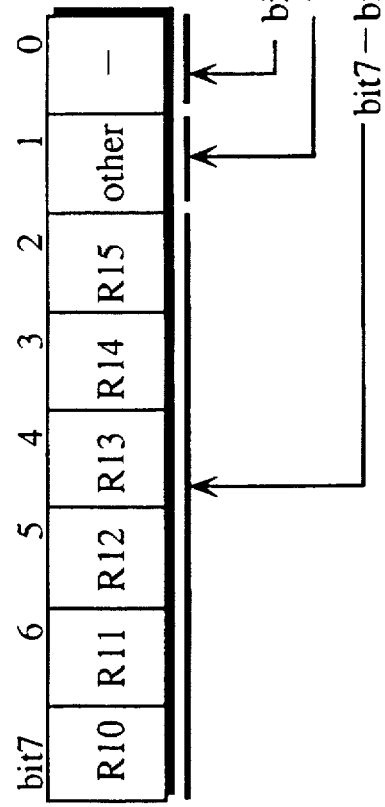

Fig. 6A

| Input<br>7654 3210 | Output<br>210 |
|---|---|
| 1xxx xxxx | 111 |
| 01xx xxxx | 110 |
| 001x xxxx | 101 |
| 0001 xxxx | 100 |
| 0000 1xxx | 011 |
| 0000 01xx | 010 |
| 0000 001x | 001 |
| 0000 0001 | 000 |

Fig. 6C

| Input<br>210 | Output<br>3210 | (Register) |
|---|---|---|
| 111 | 1010 | (R10) |
| 110 | 1011 | (R11) |
| 101 | 1100 | (R12) |
| 100 | 1101 | (R13) |
| 011 | 1110 | (R14) |
| 010 | 1111 | (R15) |

Fig. 6B

| Input<br>210 | Output<br>7654 3210 |
|---|---|
| 111 | 0111 1111 |
| 110 | 1011 1111 |
| 101 | 1101 1111 |
| 100 | 1110 1111 |
| 011 | 1111 0111 |
| 010 | 1111 1011 |
| 001 | 1111 1101 |
| 000 | 1111 1110 |

Fig. 6D

| Input<br>(765432) 10 | Output1<br>(base 10) | Output2<br>(base 10) |
|---|---|---|
| (one valid bit) 0x | 1 | 4 |
| (two valid bits) 0x | 2 | 8 |
| (three valid bits) 0x | 3 | 12 |
| (four valid bits) 0x | 4 | 16 |
| (five valid bits) 0x | 5 | 20 |
| (six valid bits) 0x | 6 | 24 |
| (one valid bit) 1x | 11 | 44 |
| (two valid bits) 1x | 12 | 48 |
| (three valid bits) 1x | 13 | 52 |
| (four valid bits) 1x | 14 | 56 |
| (five valid bits) 1x | 15 | 60 |
| (six valid bits) 1x | 16 | 64 |

Fig. 7A
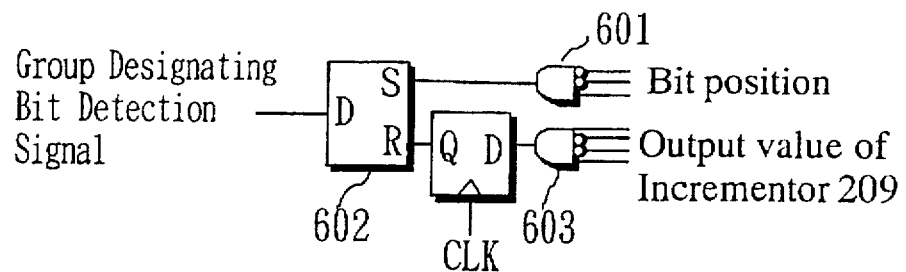
Fig. 7B
| Input | | Output |
|---|---|---|
| Bit position | Count value | |
| 001 | xxxx | set |
| xxx | 1001 | reset |
| Other | Other | store previous State |
Fig. 7C
Output value of Incrementor 209
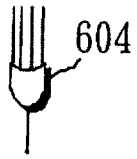
Fig. 7D
| Input | Output |
|---|---|
| 0000 | 0001 |
| 0001 | 0010 |
| 0010 | 0011 |
| ⋮ | ⋮ |
| 1000 | 1001 |
| 1001 | 0000 |

Fig. 8A

MOVM [R10−R15, other], (SP)

(a1) $\begin{bmatrix} R10 \rightarrow (SP-4) \\ R11 \rightarrow (SP-8) \\ R12 \rightarrow (SP-12) \\ R13 \rightarrow (SP-16) \\ R14 \rightarrow (SP-20) \\ R15 \rightarrow (SP-24) \end{bmatrix}$ (a2) $\begin{bmatrix} R0 \rightarrow (SP-28) \\ R1 \rightarrow (SP-32) \\ R2 \rightarrow (SP-36) \\ R3 \rightarrow (SP-40) \\ R4 \rightarrow (SP-44) \\ R5 \rightarrow (SP-48) \\ R6 \rightarrow (SP-52) \\ R7 \rightarrow (SP-56) \\ R8 \rightarrow (SP-60) \\ R9 \rightarrow (SP-64) \end{bmatrix}$ (a3) [ SP − ((Number of transferred registers) ∗ 4) → SP

Fig. 8B

MOVM (SP), [R10−R15, other]

(b1) [SP + ((Number of transferred registers) ∗ 4) → SP (b2) $\begin{bmatrix} (SP-4) \rightarrow R10 \\ (SP-8) \rightarrow R11 \\ (SP-12) \rightarrow R12 \\ (SP-16) \rightarrow R13 \\ (SP-20) \rightarrow R14 \\ (SP-24) \rightarrow R15 \end{bmatrix}$ (b3) $\begin{bmatrix} (SP-28) \rightarrow R0 \\ (SP-32) \rightarrow R1 \\ (SP-36) \rightarrow R2 \\ (SP-40) \rightarrow R3 \\ (SP-44) \rightarrow R4 \\ (SP-48) \rightarrow R5 \\ (SP-52) \rightarrow R6 \\ (SP-56) \rightarrow R7 \\ (SP-60) \rightarrow R8 \\ (SP-64) \rightarrow R9 \end{bmatrix}$

| | Instruction Bit Pattern | Instruction Mnemonic |
|---|---|---|
| (11.1) | 0x90F0FFBC | MOV SP, 0xFFFFFFBC |
| (11.2) | 0x000F00 | MOV 0x00000000, SP |
| (11.3) | 0xF00FFE | MOVM [R10-R15, other], (SP) |
| (11.4) | 0x800FFEBC | MOV 0xFFFFFEBC, SP |

0xF00F0030     MOVM [R10, R11], (SP)   ----(1')

0xF00FC0     MOVM [R10, R11], (SP)   ----(1)

0xE00F0030     MOVM (SP), [R10, R11]   ----(2')

0xE00FC0     MOVM (SP), [R10, R11]   ----(2)

(11.3')    0xF00FFFFF     MOVM [R0-R15], (SP)

(11.3)    0xF00FFE     MOVM [R10-R15, other], (SP)

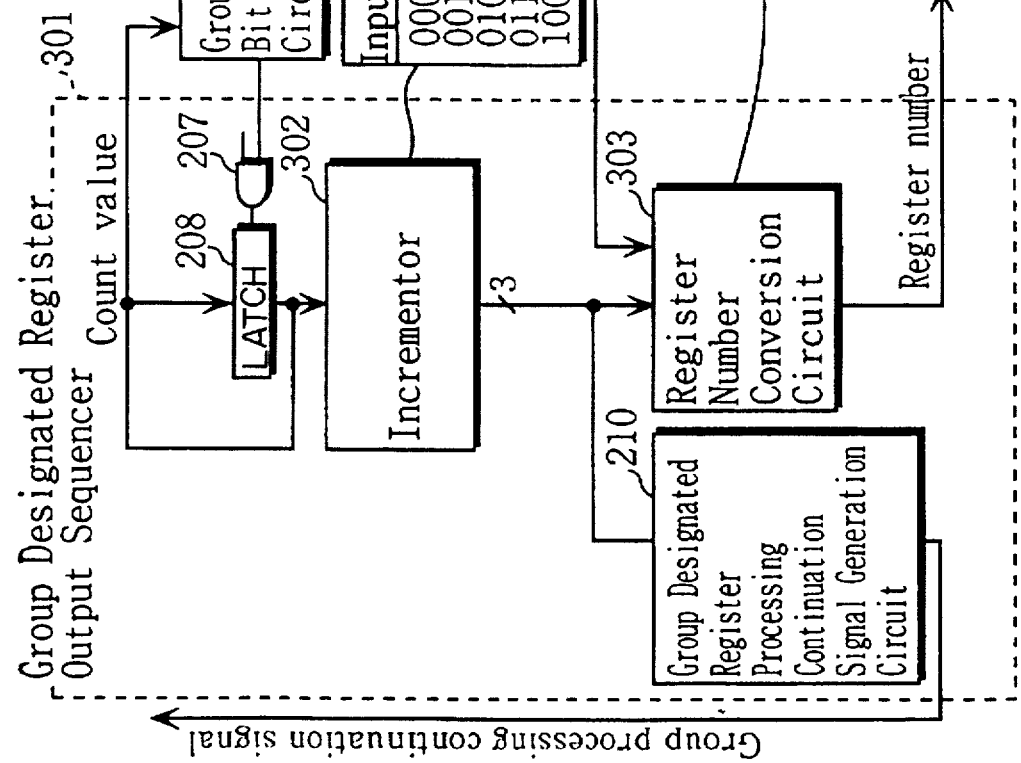

Fig. 17A

CALL (disp,PC), [R10−R15, other]

(a0) [ PC(Next instruction address) → (SP−4)

(a1) [ R10 → (SP−8)
R11 → (SP−12)
R12 → (SP−16)
R13 → (SP−20)
R14 → (SP−24)
R15 → (SP−28)

(a2) [ R0 → (SP−32)
R1 → (SP−36)
R2 → (SP−40)
R3 → (SP−44)
R4 → (SP−48)
R5 → (SP−52)
R6 → (SP−56)
R7 → (SP−60)
R8 → (SP−64)
R9 → (SP−68)

(a3) [ SP − ((No. of transferred registers) ∗ 4+4) → SP
(a4) [ PC(Same instruction address)+disp → PC

Fig. 17B

RET [R10−R15, other]

(b0) [ SP + ((No. of transferred registers) ∗ 4+4) → SP
(b1) [ (SP−4) → PC (b2) [ (SP−8) → R10
(SP−12) → R11
(SP−16) → R12
(SP−20) → R13
(SP−24) → R14
(SP−28) → R15

(b3) [ (SP−32) → R0
(SP−36) → R1
(SP−40) → R2
(SP−44) → R3
(SP−48) → R4
(SP−52) → R5
(SP−56) → R6
(SP−60) → R7
(SP−64) → R8
(SP−68) → R9

INFORMATION PROCESSING APPARATUS FOR REALIZING DATA TRANSFER FOR A PLURALITY OF REGISTERS USING INSTRUCTIONS OF SHORT WORD LENGTH

BACKGROUND OF THE INVENTION

1. Field of the Invention

The present invention relates to an information processing apparatus which is provided with instructions for data transfer between registers and consecutive areas in memory.

2. Background or the Invention

In recent years, there have been dramatic improvements in the processing power of information processing apparatuses such as microcomputers, with such devices now being used in a great variety of fields.

In general, when calling a subroutine or performing task switching, microcomputers use transfer instructions to save the content of the general registers in the memory and to restore the content once the operation is complete. For this purpose, conventional microprocessors are provided with certain kinds of transfer instructions which can achieve data transfer between a plurality of registers and memory, with an example of such being the "MOVEM instruction" as described in the "MC68040 User Manual" published by Motorola Japan, Inc.

When a plurality of registers are designated by the aforementioned "MOVEM" instruction, one bit is allocated to each register in the operands, so that a register designating field needs to include a same number of bits as there are registers to be designated. An example of a bit allocation in an operand for designating a plurality of registers in an instruction used by a conventional processor to transfer data for a plurality of registers is shown in FIG. 1. Here, the sixteen registers (made up of eight data registers and eight address registers) provided in the processor are designated using sixteen bits.

As can readily be understood, for conventional techniques, the length of the register designating field has increased in keeping with the number of registers provided in a processor, so that this has led to the problem of increased code size.

SUMMARY OF THE INVENTION

In view of the stated problem, it is a primary object of the present invention to provide an information processing apparatus which can designate a plurality of registers using only a short register designating field and which can suppress increases in code size, even when there are a large number of registers.

This object can be achieved by an information processing apparatus for executing a program, the apparatus including: a register set made up of a plurality of registers; a decoding unit for decoding machine language instructions in the program and extracting a selected machine language instruction, wherein the selected machine language instruction includes a first operand and a second operand and indicates data transfer between a plurality of registers designated by the first operand and memory designated by the second operand, wherein the first operand is made up of a single field made up of at least one bit which shows whether an individual register out of the register set is designated and a group field which shows whether a plurality of registers out of the register set which are not related to the single field are designated as a group, and the second operand designates an effective address of memory; a determining unit for determining whether each bit in the single field and in the group field of the first operand of the extracted machine language instruction is valid; a first generating unit for generating a register number for a register corresponding to a bit determined as being valid in the single field; a second generating unit for generating in order a register number of each of the registers to which the group field relates, when a bit in the group field has been determined as being valid; and a transferring unit for executing data transfer between the and registers identified by the register numbers generated by the first generating unit and the second generating unit and the consecutive memory areas starting from the effective address.

By means of the stated construction, instructions which can designate a plurality of registers can do so using only a small number of bits, so that even if the information processing apparatus has a large number of registers, a suppression in increases in code size can be achieved.

Also, the register set may include m+n registers, wherein the single field is made up of m bits which each correspond to one of the m registers and the group field is made up of one bit which designates the n registers as a group.

By means of the stated construction, in addition to the effects of the apparatus of claim 1, a plurality of registers can be designating using a one bit field.

Also, the determining unit may include: a latching unit for latching the single field and the group field in the machine language instruction extracted by the decoding unit, wherein the single field is latched at a higher position than the group field; a bit detection unit for detecting a first valid bit in the latching unit starting from a most significant bit (hereinafter, MSB) side and for outputting to the first and second generating unit a position signal showing a position of the detected bit; and a bit resetting unit for resetting the bit detected by the bit detection unit out of bits latched by the latching unit, after data transfer for one register has been performed by the transferring unit, wherein the bit detection unit may attempt detection again after a resetting operation by the bit resetting unit, and one of the first generating unit and the second generating unit may generate one register number in a data transfer cycle for one register based on the position signal.

Also, the first generating unit may generate a register number of a register out of the m registers which corresponds to the bit position, when the position signal indicates a bit position in the single field.

Also, the second generating unit may include: a group field determining unit for determining whether the position signal shows a bit position of a group field in the latching unit; and continuous generation unit for generating one register number out of the n registers in sequence in each transfer cycle when the group field determining unit has determined that the bit position of the group field is shown.

By means of the stated construction, the content of registers designated by the single field is transferred before the content of registers designated by the group field is transferred.

Also, a stack pointer may be indicated in the second operand and the transferring unit may perform data transfer between the registers having the register numbers generated by one of the first generating unit and the second generating unit and a stack area indicated by the stack pointer.

By means of the stated construction, since data transfer is performed between a plurality of registers and the stack area, saving and restoring data for subroutines and interrupt processing routines can be performed efficiently.

Also, the register set may include m+n registers, wherein the single field is made up of m bits which each correspond to one of the m registers and the group field is made up of at least two bits, wherein the second generating means successively generates register numbers corresponding to a register group made up of a chosen plurality of registers out of the n registers, in accordance with a bit pattern of the group field.

By means of the stated construction, group designation of different register groups can be performed.

Also, the machine language instruction may indicate a calculation using a plurality of pieces of register data designated by the first operand and data in a memory area which commences at an execution address designated by the second operand, wherein the information processing apparatus may include a calculating unit for executing the calculation indicated in the machine language instruction, and wherein the transferring unit may transfer a calculation result of the calculating unit to the one of the plurality of registers and the memory area.

By means of the stated construction, flexible programming which updates data collectively, such as table data in the memory, can be achieved.

BRIEF DESCRIPTION OF THE DRAWINGS

These and other objects, advantages and features of the invention will become apparent from the following description taken in conjunction with the accompanying drawings which illustrate specific embodiments of the invention. In the drawings:

FIG. 2 shows the specification of the transfer instructions for a plurality of registers in the first embodiment of the present invention;

FIG. 6A is a figure showing the I/O logic of the priority encoder 202;

FIG. 6B is a figure showing the I/O logic of the decoder 203;

FIG. 6C in a figure showing the I/O logic of the register number conversion circuit 204;

FIG. 6D is a figure showing the I/O logic of the number of registers detection circuit 214;

FIG. 7A is a specific example of a circuit for the group designating bit detection circuit 205;

FIG. 7B is a figure showing the I/O logic of the group designating bit detection circuit 205;

FIG. 7C is an example circuit diagram for the group processing continuation signal generation circuit 210;

FIG. 7D is a figure showing the I/O logic of the incrementor 209;

FIGS. 8A and 8B are figures showing the control procedure of a MOVM instruction executed by the instruction decoder 101 in the present embodiment as register transfer levels;

FIG. 16 is a figure showing the I/O logic of the register number conversion circuit 303 in the present embodiment; and FIGS. 17A and 17B show the control procedures for the instruction decoder 101 when the present invention is used for a subroutine call instruction and a return instruction from a subroutine.

DESCRIPTION OF THE PREFERRED EMBODIMENTS

FIG. 2 shows the specification of the transfer instructions for a plurality of registers in the first embodiment of the present invention. As shown in this figure, "MOVM regs, <ea>" is a machine language instruction indicating block transfer of the data in a plurality of registers to consecutive areas in the memory, the instruction being expressed in mnemonic form. Here, "MOVM <ea>,regs" is a machine language instruction indicating block transfer from consecutive areas in the memory to a plurality of registers. "MOVM" is OP code and is assigned different code in a former and a letter field to express the direction of transfer. "ea" is an operand designating an address in memory, with data being transferred from consecutive memory areas starting at the indicated affective address. In the present embodiment, an effective address is designated by indirect addressing using a stack pointer. "regs" is an operand for indicating the registers used in the transfer and it expresses a register designating field which may indicate a plurality of registers. This register designating field has the eight-bit composition shown in FIG. 2 and so includes both a single register designating field end a group designating field. In the illustrated example, the single register designating field is the six bits shown as bit 7 to bit 2 which, in order starting from the most significant bit (hereinafter, MSB), respectively correspond to R10, R11, R12, R13, R14 and R15, with a setting of "1" in these bits signifying the transfer of data for the register which corresponds to the "1" values. In the present construction, there are sixteen general registers (R0–R15).

It is desirable for the registers which are designated by the aforementioned single register designating field and group designating field to be classified so at to respectively correspond to the destroyed registers and the non-destroyed registers determined by a compiler. Here, destroyed registers are registers whose data is changed during a subroutine, which is to say registers whose data does not need to be saved-in and restored-from the stack. Conversely, non-destroyed registers whose data needs to be stored during a subroutine, so that their data must be saved in and restored from the stack.

Figure 1:
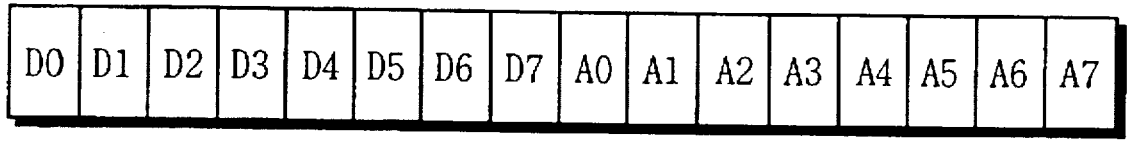
FIG. 1 shows a bit allocation in the operand for designating a plurality of registers in an instruction used by a conventional processor to transfer data for a plurality of registers.
Figure 3:
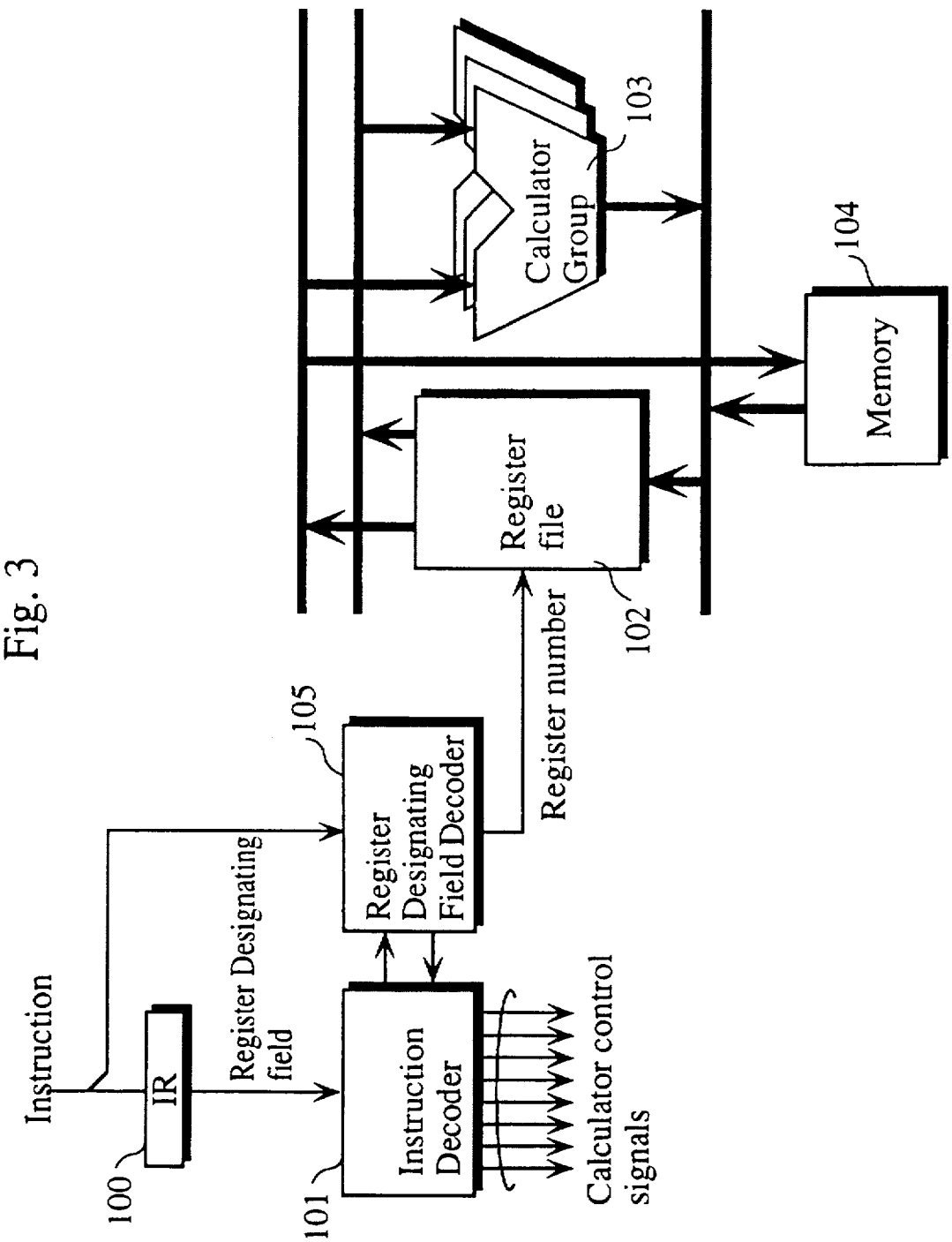
FIG. 3 is a block diagram showing the principle elements of the construction of the microcomputer in the present invention.

FIG. 3 is a block diagram showing the principle elements of the construction of the microcomputer in the present invention. As shown in the diagram, the principle elements of the construction of the present microcomputer are instruction register 100, instruction decoder 101, register file 102, calculator group 103, memory 104 and register designating field decoder 105.

The instruction register 100 stores instructions in the order they are fetched from the memory 104.

The instruction decoder 101 decodes the instructions stored in the instruction register 100 and outputs a variety of control signals for controlling the execution Of the instruction. In particular, on decoding a MOVM instruction such as that shown in FIG. 2, the instruction decoder 101 controls the transfer of data between the registers having the register numbers which are successively output by the register designating field decoder 105 and the consecutive areas in the memory 104 designated by the <ea> operand The register file 102 is made up of general registers R0–R15, each of 32 bit length, and a stock pointer SP of 32 bit length which designates a start of the stack area in the memory 104.

The calculator group 103 includes a plurality of calculators which calculate the effective address designated by an operand in an instruction. One of the calculators in the calculator group 103 (hereinafter referred to as the "specialized calculator") is specially provided to calculate an operand address. When the MOVM instruction shown in FIG. 2, is executed, this specialized calculator successively calculates memory addresses of consecutive areas by adding an offset value (a multiple of four) to the value of the stack pointer designated by the <ea> operand each time a set of 32-bit data is transferred, based on control by the instruction decoder 101.

The memory 104 stores a program which includes the MOVM instruction shown in FIG. 2 as well as data, with a stack area being included in part of its storage area.

The register designating field decoder 105 decodes the "reg" operand when the MOVM instruction shown in FIG. 2 has been decoded by the instruction decoder 101 and outputs the register numbers of the designated registers to the register file 102.

Figure 4:
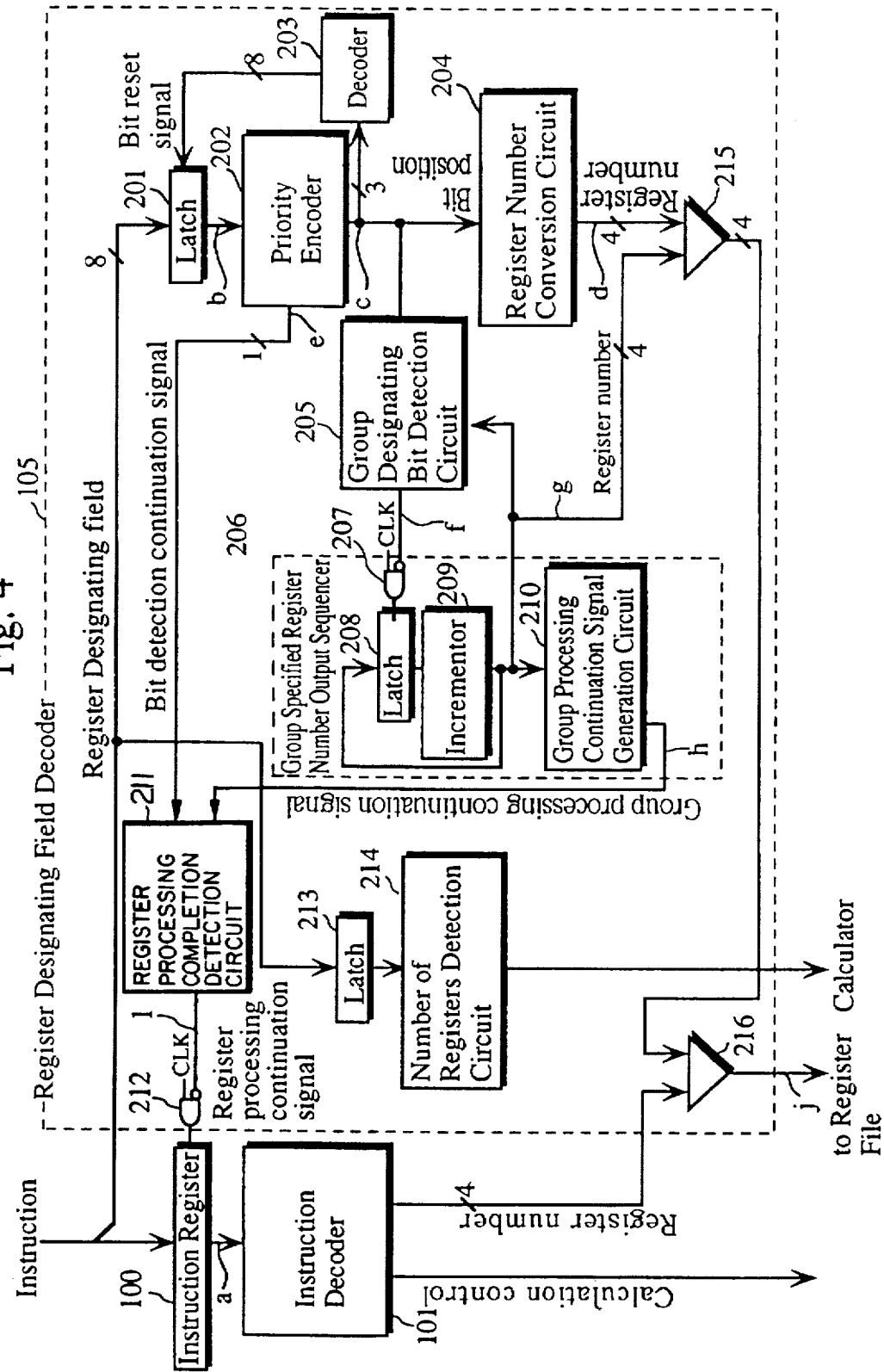
FIG. 4 is a block diagram showing the internal construction of the register designating field decoder 105 in the same embodiment.

FIG. 4 is a block diagram showing the internal construction of the register designating field decoder 105. As shown in the diagram, the register designating field decoder 105 is made up of latch 201, priority encoder 202, decoder 203, register number conversion circuit 204, group designating bit detection circuit 205, group designated register number output sequencer 206, register processing completion detection circuit 211, AND gate 212, latch 213, number of registers detection circuit 214, selector 215 and selector 216. Furthermore, the group designated register number output sequencer 206 is made up of AND gate 207, latch 208, incrementor 209 and group processing continuation signal generation circuit 210.

Figure 5:
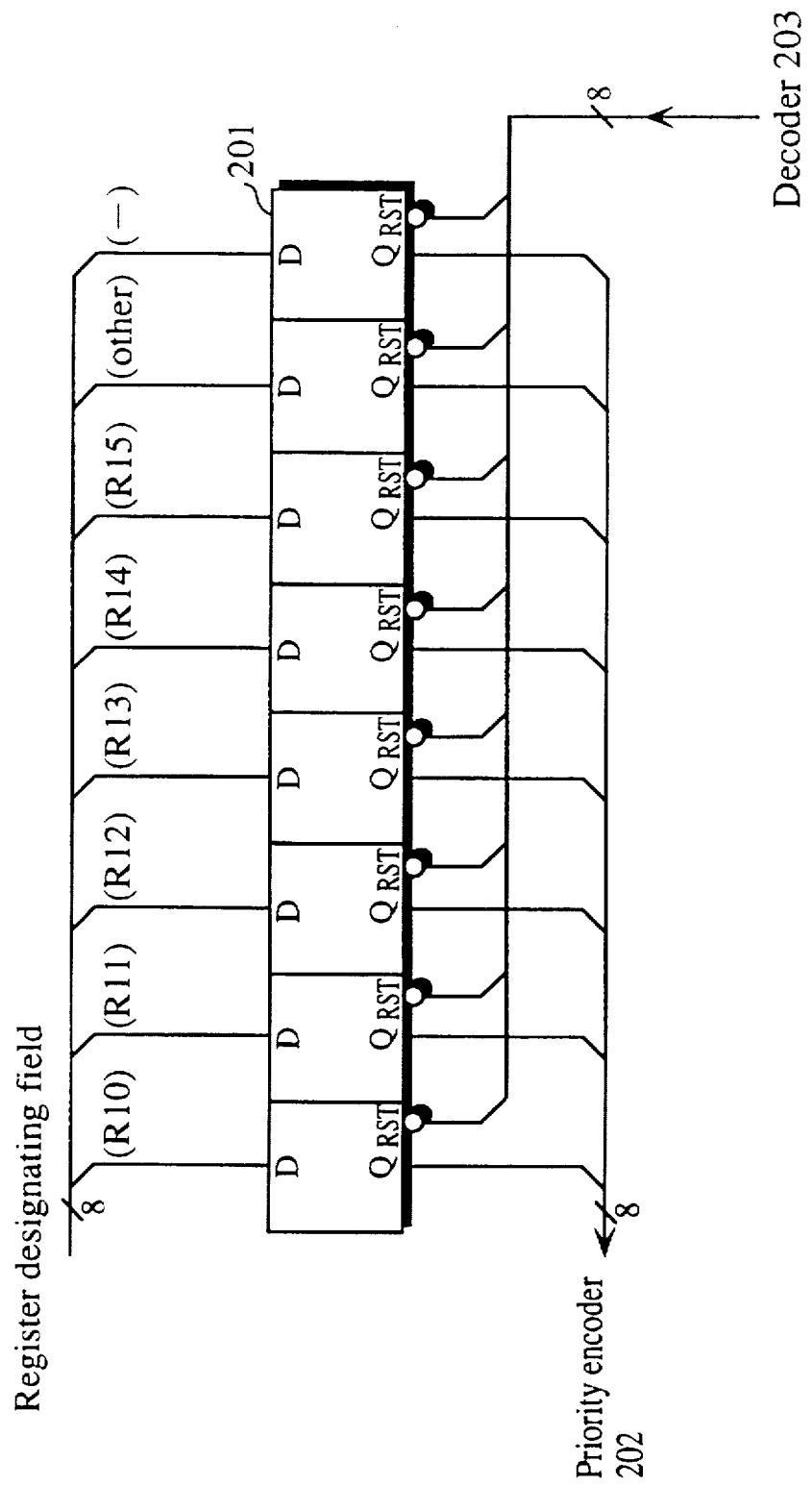
FIG. 5 is a specific circuit diagram for the latch 201 in the same embodiment.

The latch 201 latches the register designating field in a MOVM instruction as soon as a MOVM instruction is detected by the instruction decoder 101. Here, each one of the latched bits which is "1" is reset in order by the decoder 203 each time data transfer is performed. FIG. 5 shows a specific circuit diagram for the latch 201. As shown in the drawing, it is made up of eight one-bit latch circuits. Each of these latch circuits is provided with its own reset terminal and is reset by the decoder 203 when a corresponding "1" is detected by the priority encoder 202.

The priority encoder 202 separately detects a highest order bit which is set at "1" in the register designating field in the latch 201 during each data transfer cycle and outputs signal showing the indicated bit position (hereinafter referred to as the "bit position signal"). Here, FIG. 6A is a figure showing the I/O (Input/Output) logic of the priority encoder as a truth table. In FIG. 6A, the input and output columns contain values given as binary numbers. As shown by the "input" column, the priority encoder 202 detects the first bit set at "1" starting from the MSB side of the latch 201 during each data transfer cycle. The result of the detection is output as a bit position expressed using three bits, as shown in the "output" column of FIG. 6A. Following this, the detected "1" bit is reset by the decoder 203, so that one valid bit in the single register designating field (bit 7–bit 2) is detected in order during each transfer cycle. Also, the priority encoder 202 sets the detection continuation signal at a valid "1" and outputs it during the period from the detection of the first "1" in latch 201 to the detection of the final "1" bit.

The decoder 203 receives an input containing the bit position detected by the priority encoder 202 and resets the valid bit in the latch 201 which corresponds to the bit position to zero. FIG. 6B is a figure (truth table) showing the I/O logic of the decoder 203. In FIG. 6B, the input and output columns contain values given as binary numbers. As one example, when the bit position "111" is input from the priority encoder 202, the output is such that only bit 7 in latch 201 is reset to zero. By doing so, it becomes possible for the next lower order "1" bit in the latch 201 to be detected by the priority encoder 202 in the next data transfer cycle.

The register number conversion circuit 204 receives an input of the bit position from the priority encoder 202 and outputs a register number of a register which corresponds to the bit position. FIG. 6C is a figure (truth table) showing the I/O logic of the register number conversion circuit 204. In FIG. 6C, the input and output columns contain values given as binary numbers. In the present embodiment, registers R0–R15 in the register file 102 are allocated a register number expressed by one of the binary numbers 0000–1111. As one example, when the input is "111", the output is the register number "1010" which is for register R10. As shown by the input and output columns of FIG. 6C, the register number conversion circuit 204 outputs only a register number which corresponds to the bit position which represents a bit in the single register designating field The group designating bit detection circuit 205 detects the bit position which shows the group designating bit, out of the bit positions in priority encoder 202, and outputs a group designating bit detection signal showing that the group designating bit has been detected. Here, FIG. 7A is a specific example of a circuit for the group designating bit detection circuit 205, with FIG. 7B showing its I/O logic. As shown in FIG. 7A, the group designating bit detection circuit 205 is made up of an AND gate 601, an RS flip-flop 602 and an AND gate 603. The AND gate 601 detects whether the bit position is "001", which indicates detection of the group designating field. As shown in FIG. 7B, the RS flip-flop 602 is set as soon as the group designating field has been detected by the AND gate 601, and is reset by AND gate 603. The AND gate 603 reacts the RS flip-flop 602 as soon as the count value output of the incrementor 209 becomes "1001". By doing no, the group designating bit detection signal in set at "1" (valid) as soon as "1" has been detected in the group designating field by the priority encoder 202 and is set at "0" (invalid) when the count value output of the incrementor 209 becomes "1001" in the next cycle.

The group designated register number output sequencer 206 outputs the register numbers of registers R0–R9 one at a time in a data transfer cycle when the group designating bit detection signal from the group designating bit detection circuit 205 is valid.

The AND gate 207 enables the supply of a latch clock to the latch 208 when the group designating bit detection signal is valid.

The latch 208 is a latch of 4-bit length and latchs the output of the incrementor 209 for each data transfer cycle when the group designating bit detection signal is valid. As soon as the count value output of the incrementor 209 becomes "1001", the group designating bit detection signal becomes invalid, so that the latch 208 holds "1001" while the group designating bit detection signal in invalid.

The incrementor 209 successively outputs a register number from "0000" to "1001" by adding one each time to the output of the latch. Here, FIG. 7D is a figure showing the I/O logic of the incrementor 209. As shown in FIG. 7D, the output becomes "0000" when the input is "1001", while when the input is between "0000" and "1000", the output is greater than the input by 1. By doing so, the register numbers of register R0–R9 are output in sequence in synchronization with each data transfer cycle.

The group processing continuation signal generation circuit 210 outputs the group processing continuation signal which shows that data transfer to the group designated registers is still taking place. An example circuit diagram for the group processing continuation signal generation circuit 210 is shown in FIG. 7C. As shown in the drawing, the group processing continuation signal generation circuit 210 is made up of an OR gate 604 which sets and outputs the group processing continuation signal at "1" (value) unless the count value of the incrementor is "0000".

The register processing completion detection circuit 211 takes a logical AND of the bit detection continuation signal from the priority encoder 202 and the group processing continuation signal and outputs the result as the register processing continuation signal. This register processing continuation signal is set at "1" (valid) while all the register numbers indicated in the register designating field are being output.

The AND gate 212 prohibits the supply of the clock to the instruction register while the register processing continuation signal is valid.

The latch 213 latches the register designating field in the MOVM instruction field as soon as a MOVM instruction is detected by the instruction decoder 101.

The number of registers detection circuit 214 detects the number of registers designated by the register designating field in the latch 213 and the memory size (transfer data size) which is necessary for the transfer of data in those registers. Here, FIG. 6D is a table showing the I/O logic of the number of registers detection circuit 214. In this drawing, the value "Input" is the value in the register designating field in the latch 213. Here, the number of valid "1" it bite in bit 7 to bit 2 in this input column in abbreviated, so that the patterns "100000", "010000", "001000", "000100", "0000100" and "000001" which all contain only one valid bit are expressed simply as "one valid bit". Here, output column 1 shows the number of registers and output column 2 shows the transfer data size. In the present embodiment, each register is four bytes long, so that the transfer data size is four bytes multiplied by the number of registers shown in output column 1.

FIG. 8A and 8B are figures showing the control procedure of a MOVM instruction executed by the instruction decoder 101 as register transfer levels.

Figure 9:
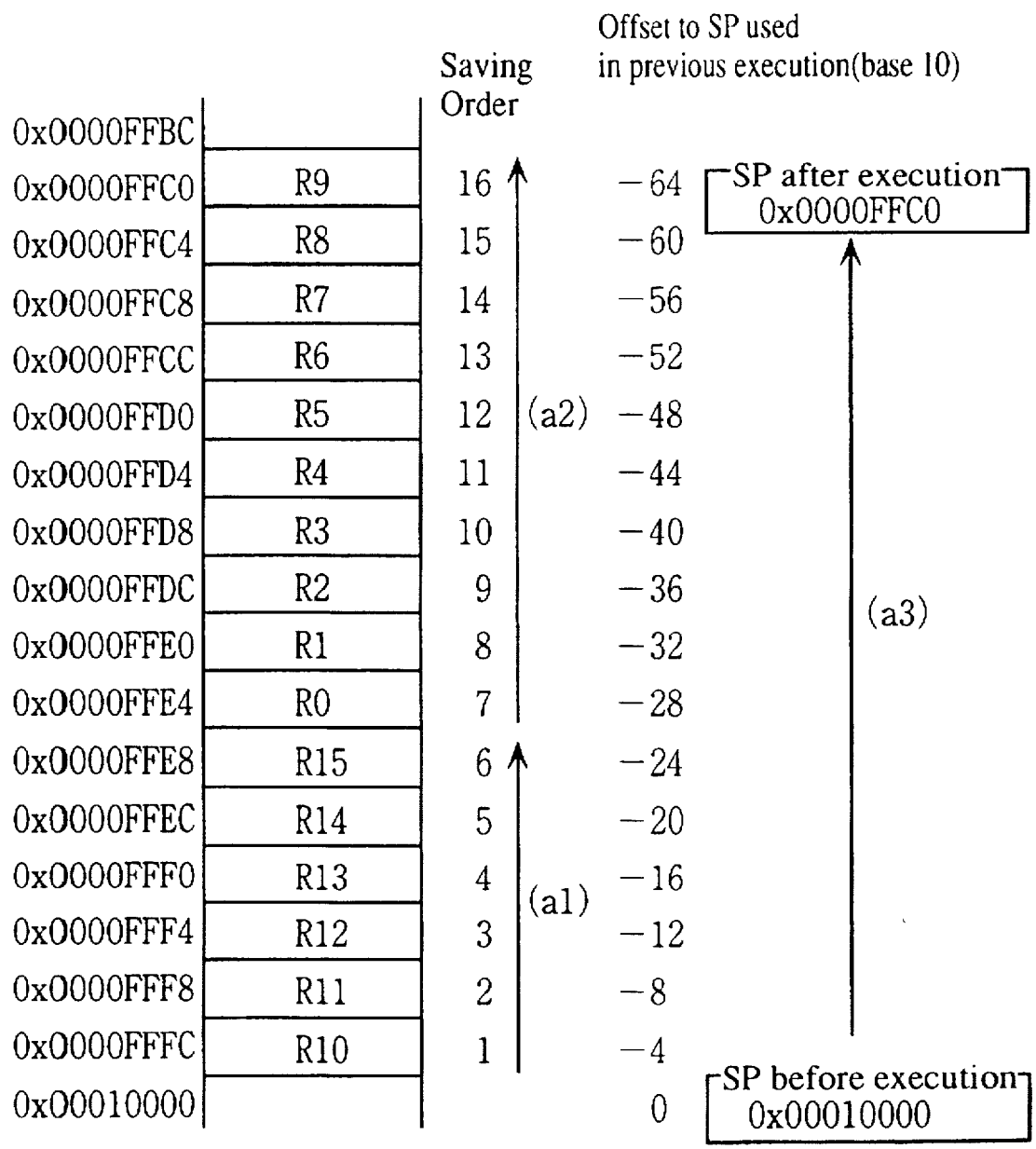
FIG. 9 is a drawing showing the order in which a plurality of pieces of register data are stored in memory by a MOVM instruction in the same embodiment.

As shown in FIG. 8A, the instruction MOVM |R10–R15, other|, (SP) indicates the storing of data from all of the designated registers in the memory. FIG. 9 shows the order in which data is stored in the memory by this instruction.

The part shown as (a1) in FIG. 9 is the control sequence for transferring register data designated in the single register designating field to the memory. As one example, for (R10→ (SP-4)), the instruction decoder 101 transfers data by reading the data in register number 10 and writing this data into an address indicated by the content of the stack pointer minus four. The register number used at this point is generated by the register number conversion circuit 204 and is supplied to the register file 102. The memory address used here is obtained by the specialized calculator subtracting 4 from the content of the SP. In the above example, every register in the single register designating field has been designated, although when any given register is not indicated, its register number is not generated by the register number conversion circuit 204 and its content is not transferred. The part shown as (a2) in FIG. 9 is the control sequence for transferring register data designated in the group designating field to the memory. Here, the control procedure of the instruction decoder 101 is the same as above. However, there is a difference in that the register numbers are generated by the incrementor 209. Here, in performing the data transfer in (a1) and (a2), the instruction decoder 101 has the specialized calculator generate memory addresses by subtracting multiples of four (4, 8, 12 . . . ) in each data transfer cycle in order from the content of the stack pointer SP.

The part Shown as (a3) in FIG. 9 shows the updating of the stack pointer. The instruction decoder 101 has the transfer data size generated by the number of registers detection circuit 214 (the number of transferred registers *4) subtracted from the stack pointer by the specialized calculator and stores the result in the stack pointer SP.

Figure 10:
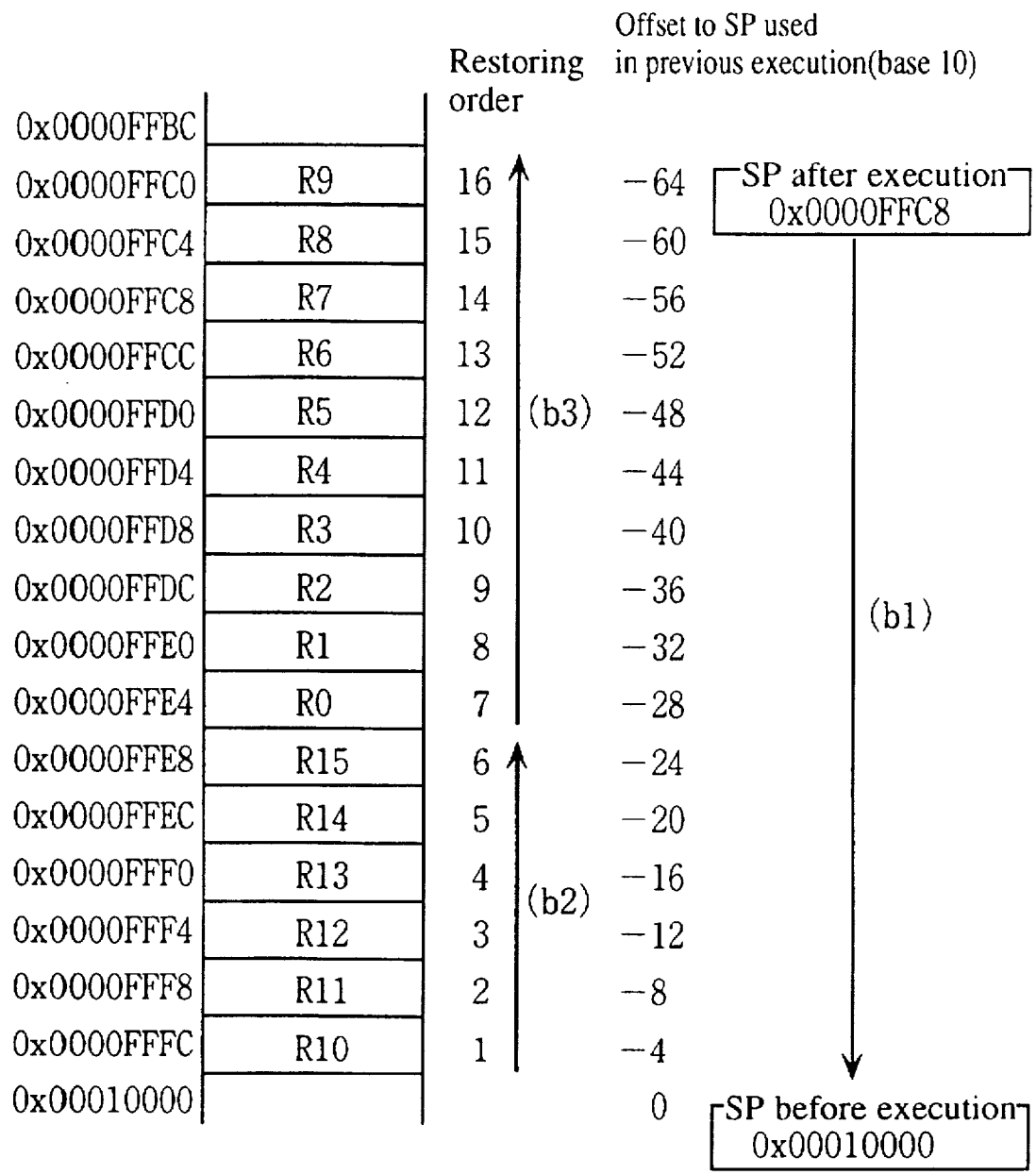
FIG. 10 is a drawing showing the order in which a plurality of pieces of data hold in the memory are stored in registers by a MOVM instruction in the came embodiment.

As shown in FIG. 8B, the instruction MOVM (SP), |R10–R15, other| indicates the restoring of data from the memory to all of the designated registers. FIG. 10 shows the order in which data is restored in the registers R0–R15 from the memory by this instruction. The control sequence performed by instruction decoder 101 for this instruction, with the exception of the initial updating of the stack pointer and the direction of transfer (memory to registers), is exactly the same as described above for FIGS. 8A and 9, so that the explanation will not be repeated.

Figure 11:
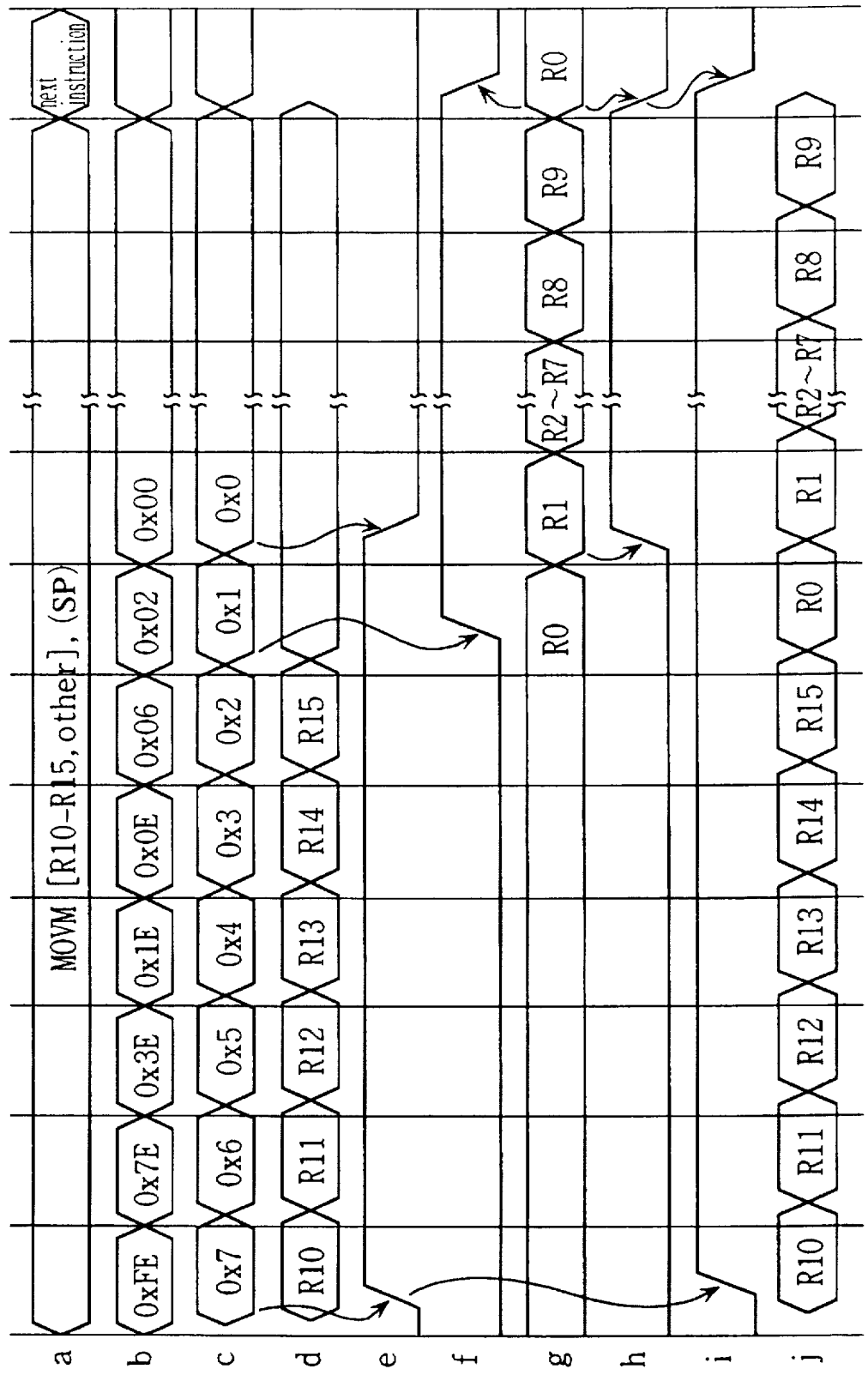
FIG. 11 shows an execution time chart for a MOVM instruction in the same embodiment.

FIG. 11 shows the execution time chart for the instruction MOVM |R10–R15, other|, (SP) in FIG. 8A. In this drawing, a–j are the same as the references given in FIG. 4 and represent the signals described below. Here, fields marked as (0×) are given in hexadecimal.

a: content of instruction register b: register designating field in latch 201 c: bit position output by priority encoder 202 d: register number output by register number conversion circuit 204 e: bit detection continuation signal output from priority encoder 202 f: group designating bit detection signal output from group designating bit detection circuit 205 g: register number output by incrementor 209 h: group processing continuation signal output by group processing continuation signal generation circuit 210 i: register processing continuation signal output by register processing completion detection circuit 211 j: register number output by selector 216

For the MOVM instruction shown in FIG. 11, the plurality of pieces of register data indicated in the register designating field are transferred in order in a same number of transfer cycles. This figure shows the case when all of the registers are designated, although when any of the bits in the single register designating field for registers R10–R15 are set at "0", such transfer cycles are not performed. In the same way, when the group designating field is "0", transfer cycles for R0–R9 are not performed.

The following is an explanation of the operation for the case when a plurality of pieces of data are transferred from the memory to the registers by an information processing apparatus of the construction described above.

In general, subroutines make use of a number of general registers as destroyed registers, with the remaining general registers being used as non-destroyed registers. As one example, when registers R0–R9 are defined as destroyed registers, it is not necessary to have the data in these registers saved in and restored from the stack during the subroutine. Accordingly, only when more registers than this number (10) of destroyed registers are needed by a subroutine are the necessary extra number of non-destroyed registers saved in and restored from the stack.

As one example, when two registers (R10, R11) are needed in a subroutine in addition to the destroyed registers, the instruction (1) below may be executed at the start of the subroutine with the instruction (2) being executed at the end.

*MOVM [R10,R11], (SP)*  (1)

*MOVM (SP), [R10,R11]*  (2)

By doing so, the present microcomputer stores non-destroyed registers R10 and R11 in the stack just after the start of execution of the aforementioned subroutine and restores R10 and R11 from the stack just before the end of execution of the aforementioned subroutine. The execution of instruction (1) is completed in the first two cycles as shown in FIG. 11.

The following explanation is for an example of saving and restoring context which accompanies a task switch. Here, an example of a context saving program is shown in FIG. 12.

Figures 12, 13:
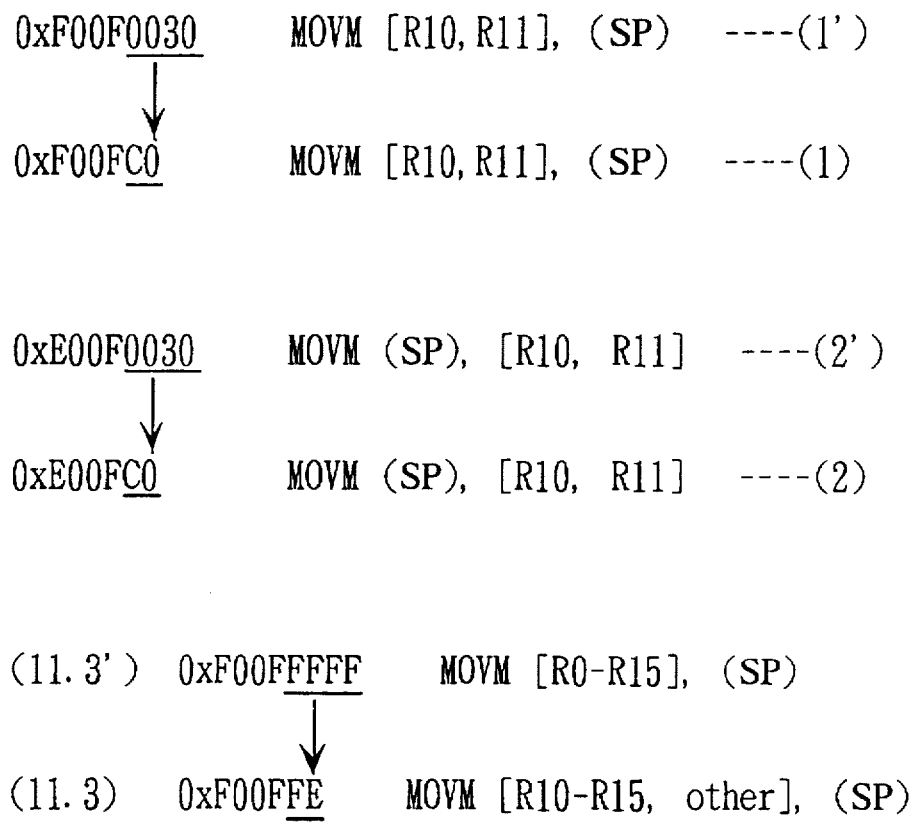
FIG. 12 is an example of a context saving program in the same embodiment.
FIG. 13 is a comparison of a conventional MOVM instruction with a MOVM instruction in the present embodiment.

In FIG. 12, (11.1) is an instruction for saving a value of the stack pointer SP in the stack pointer saving area in a predetermined context saving area. Here, for the sake of convenience, the saving address of the stack pointer is set as 0xFFFF FFBC. Here, (11.2) is an instruction for setting a predetermined fixed address in the stack pointer SP as the context saving area. Again, for the sake of convenience, this fixed address is set as 0x0000 0000. The instruction (11.3) is a MOVM instruction for saving the content of all of the registers in the context saving area. On the other hand, the instruction (11.4) is an instruction for loading a value from the area storing the stack pointer value for the new task to be executed by the task switch into the stack pointer SP. Here, for the sake of convenience, the stack pointer saving area for the new task to be executed is set as the area 0xFFFF FEBC.

By executing the program described above, the content of all of the registers R0–R15 is transferred to the context saving area. The transfer operation achieved by the MOVM instruction in (11.3) has the same time chart as that shown in FIG. 11 and so is performed in sixteen cycles.

By means of the present embodiment described above, registers are grouped into destroyed registers and non-destroyed registers, so that by assigning the destroyed registers to the group designating field which can be specified using only one bit, a great number of registers can be designated by only one or a few bits, so that it is not necessary to increase code size when the number of registers is large. Here, a comparison of a MOVM instruction in the present invention and a conventional MOVM instruction is shown in FIG. 13. In this figure, (1), (2) and (11.3) show the instruction bit pattern of the MOVM instruction of the present embodiment described above and the instruction mnemonics. On the other hand, (1'), (2') and (11.3') show the instruction bit pattern of the MOVM instruction and the instruction mnemonics according to the prior art. Here, for the instructions (1) and (2), the value "0xC0" in the third byte designates register R10 and R11, while in instructions (1') and (2'), the value "0x0030" in the third and fourth bytes designates register R10 and R11. Similarly, in instruction (11.3), the value "0xFE" in the third byte designates all registers R0–R15, while in instruction (11.3'), the value "0xFFFF" in the third and fourth bytes designates all registers R0–R15. Accordingly, for the present embodiment, a saving of one byte of code size can be made over the conventional art for each MOVM instruction. Most programs are created in the form of a great number of subroutines, so that MOVM instructions are very frequently used to save and restore registers for such subroutines. As a result, a reduction in the code size of the program as a whole can be achieved.

It should be noted here that in the present invention, registers are grouped into destroyed registers and non-destroyed registers defined by a compiler, although the registers may be grouped using a different criterion.

Furthermore, the multiple register objects of the present embodiment were set as load and store registers, although it should also apply to calculation instructions which use a plurality of registers.

Figure 14:
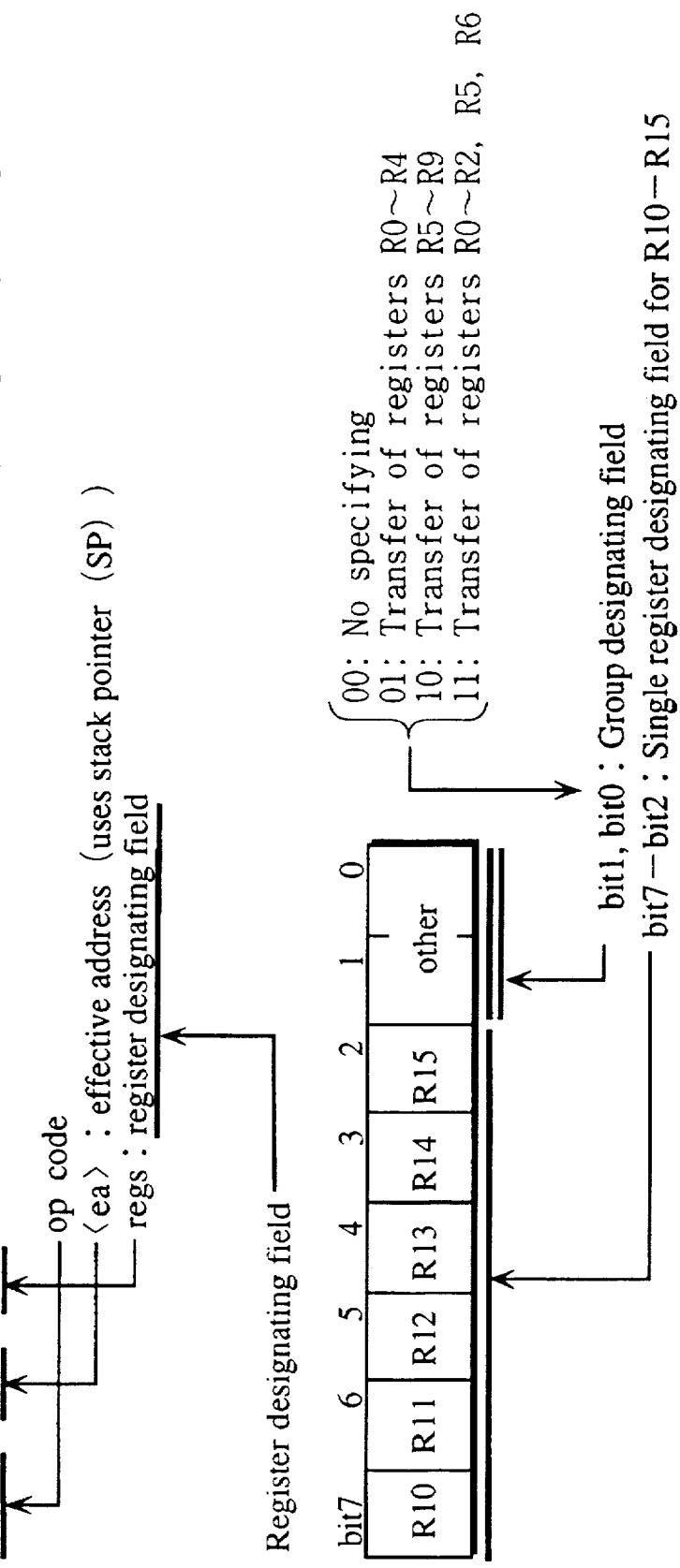
FIG. 14 shows the specification of a transfer instruction for a plurality of registers in the second embodiment of the present invention.

FIG. 14 shows the specification of a transfer instruction for a plurality of registers in the second embodiment of the present invention. This transfer instruction is the same as the MOVM instruction shown in the first embodiment, except that the group designating field 18 made up of two bits. The similarities with the first embodiment will not be explained, so that the following description will focus on the characteristic features of the second embodiment. As shown in FIG. 14, when bit 1 and bit 0 in the register designating field are set at "00", none of registers R0–R9 are designated, while a setting of "01" refers to a designation of registers R0–R4, a setting of "10" to a designation of registers R5–R9 and a setting of "11" to a designation of registers R0–R2, R5 and R6. Here, registers R0–R4 are set as group 1, registers R5–R9 are set as group 2 and registers R0–R2, R5 and R6 are set as group 3. Here, in the present embodiment, the group designating field in the MOVM instruction can designate any of groups 1, 2 or 3.

The principle construction of the microcomputer in the present invention is the essentially the same as in the first embodiment shown in FIG. 3 and so will not be explained. The internal construction of the register designating field decoder 105 is somewhat different, however, in order to decode the two-bit register designating field.

Figure 15:
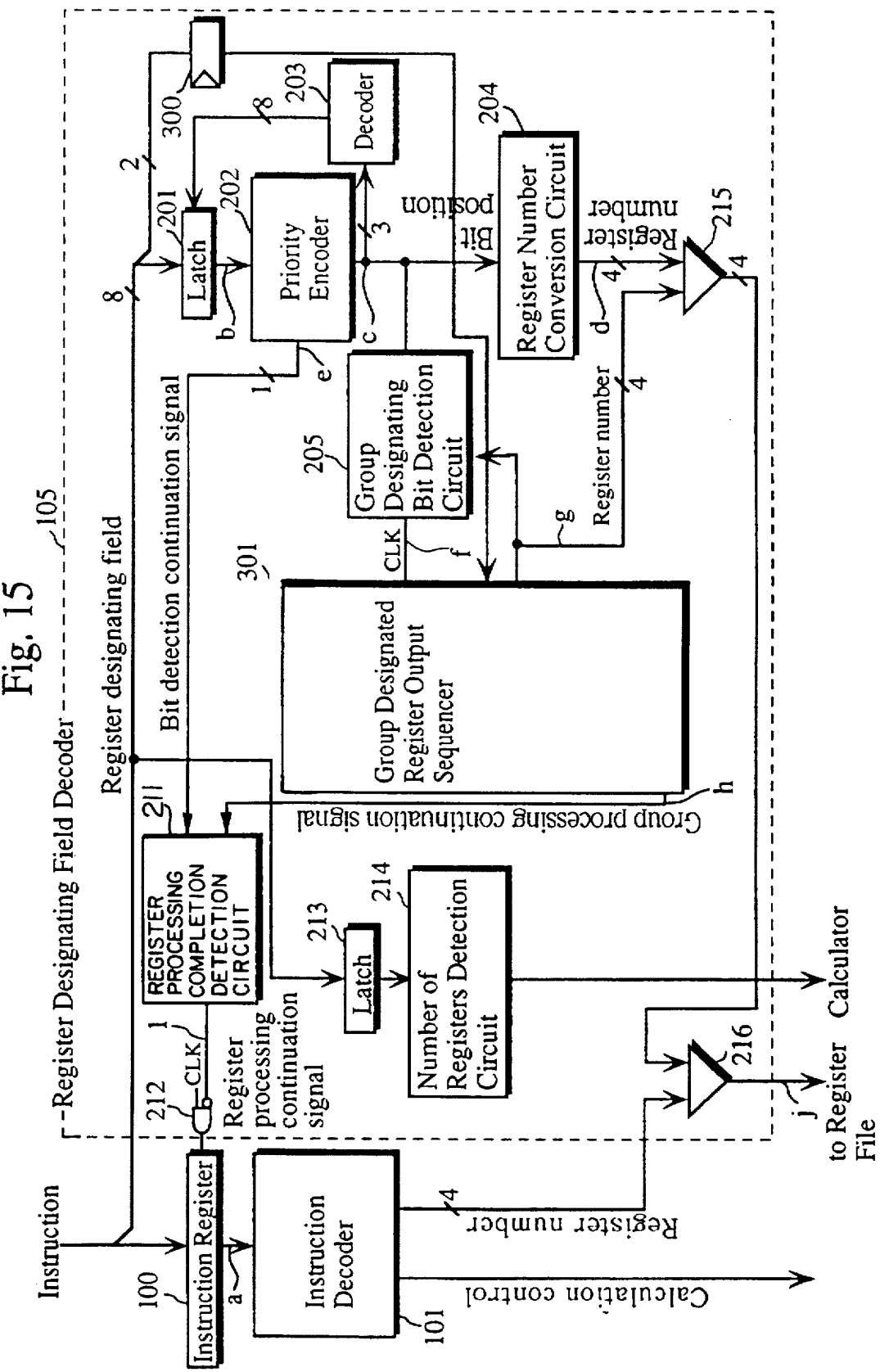
FIG. 15 is a block diagram showing the internal construction of the register designating field decoder in the embodiment shown in FIG. 14.

FIG. 15 is a block diagram showing the internal construction of the register designating field decoder. As shown in the drawing, the latch 300 latches the two bits in the register designating field of the MOYM instruction as soon as a MOVM instruction has been detected by the instruction decoder 101 and outputs the two bits to the group designated register output sequencer 301.

The group designated register output sequencer 301 generates the register numbers for registers R0–R4 in order when group 1 is designated by the value of the group designating field input from latch 300, for registers R5–R9 in order when group 2 is designated and for registers R0–R2, R5 and R6 in order when group 3 is designated.

FIG. 16 is a block diagram showing the internal construction of the group designated register output sequencer 301. Here, construction elements which are the same as in FIG. 4 have been given the same reference numerals and their explanation has been omitted.

The incrementor 302 differs from the incrementor 209 in FIG. 4 in that it counts from 0 to 4, with, as shown by the I/O table in FIG. 16, its output becoming "000" when its input is "100".

As shown by the I/0 table in FIG. 16, the register number conversion circuit 303 converts the count value output by the group designated register output sequencer 301 into register numbers in a group designated by the group number given by the value in the group designating field output from the latch 300. It then outputs the generated register numbers in order.

Since the registers which can be group designated in the present embodiment are split into groups as described above, a desired group can be selected in accordance with the use of the microcomputer which allows flexible programming to be achieved.

It should be noted hare that the first and second embodiments described the case where a MOVM instruction was used, although the present invention is not limited to such transfer instructions and so can be used for calculation operations which execute calculation between a plurality of registers and consecutive areas of the memory. As one example, when the present apparatus uses an add instruction such as ADDM (SP),[R10–R16, other], the calculator group 103 is controlled by the instruction decoder 101 to add the register data and memory data and transfer the result to memory. By doing as, flexible programming, such as the group updating of data for a data table in the memory, can be achieved.

Examples where the present invention is adapted to other instructions are shown in FIGS. 17A and 17B. Here, FIGS. 17A and 17B show the control procedures for the instruction decoder 101 when the present invention is used for a subroutine call instruction and a return instruction from a subroutine, with these procedures being expressed using register transfer levels.

In FIG. 17A, the CALL (disp.PC), |R10–R5,other| instruction is an instruction which indicates the calling of a subroutine and the saving of data from a plurality of registers in the stack in the memory. The operand (disp.PC) shows the starting address of the subroutine. This starting address is obtained by adding a displacement to the value of the program counter PC which is the instruction address of this instruction itself. The other operand |R10–R15,other| show the register data which is to be saved in the stack during the subroutine call and, as described above, is composed of a single register designating field and group designating field.

In FIG. 17A, the register transfer indicated as the part (a0) shows the saving in the stack of the value of the program counter PC (the return address for the subroutine).

The part labelled (a1) shows the saving in the stack of the registers designated by the single register designating field. Note that while the case where every register in this field is designated is shown in this drawing, register data which in not designated is not saved in the stack.

The part labelled (a2) shows the saving in the stack of the registers designated by the group designating field. Note that while the case where the registers in this field are designated is shown in this drawing, register data in registers R0–R9 is not saved in the stack when this group designating field in not valid.

The part labelled (a3) shows the updating of the stack pointer for stack (to secure the stack).

The part labelled (a4) shows the updating of the program counter, which is to way a branch to the subroutine.

In FIG. 17B, the instruction RET, |R10–R15,other| in an instruction which indicates a return of data from the stack to a plurality of registers and a return from the subroutine. The operand |R10–R15,other|, as described above, is composed of a single register designating field and group designating field and shows the register data which is to be returned from the stack after the completion of the subroutine. Since this instruction is used an a pair with the CALL instruction, it needs to designate the name registers as the CALL instruction.

The part labelled (b0) in FIG. 17D shows the updating of the stack pointer (to release the stack).

The part labelled (b1) shows the updating of the program counter PC, which is to say a return from the subroutine.

The part labelled (b2) shows the return from the stack of the registers designated by the single register designating field. Note that while the case where every register in this field is designated is shown in this drawing, register data which is not designated is not returned from the stack.

The part labelled (b3) shows the return from the stack of the registers designated by the group designating field. Note that while the case where the registers in this field are designated is shown in this drawing, register data in registers R0–R9 in not returned from the stack when this group designating field is not valid.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An information processing apparatus for executing a program from a memory, the apparatus including:

a register set having a plurality of registers;

decoding means for decoding machine language instructions in the program and extracting a selected machine language instruction, wherein the selected machine language instruction includes a first operand and a second operand and indicates data transfer between a plurality of registers from the register set designated by the first operand and a memory block designated by an effective address of the memory block stored in the second operand, wherein the first operand has a single field of at least one bit which shows whether each individual register of a plurality of registers from the register set, represented by the bits of the single field, is individually designated, and a group field which shows whether a plurality of registers of the register set which are not represented by the bits of the single field are designated as a register group, wherein there are more registers in the register group than there are bits in the group field;

determining means for determining whether each bit in the single field and in the group field of the first operand of the selected machine language instruction is valid;

first generating means for generating a register number for each register corresponding to a bit in the single field determined as being valid;

second generating means for generating, in order, a register number of each of the registers in the register group to which the group field relates, when a bit in the group field has been determined as being valid; and transferring means for executing data transfer between registers identified by the register numbers generated by the first generating means and the second generating means and consecutive memory areas starting from the effective address of the memory block.

2. The information processing apparatus of claim 1, wherein the register set includes m+n registers, wherein the single field has m bits each corresponding to one of the m registers and the group field has one bit designating the n predetermined registers as the register group, wherein m and n are integers.

3. The information processing apparatus of claim 2, wherein the determining means includes:

latching means for latching the single field and the group field in the selected machine language instruction, wherein the single field is latched at a higher bit position than the group field;

bit detection means for detecting a first valid bit in the latching means starting from a most significant bit (MSB) side and for outputting to the first or second generating means a position signal showing a bit position of the detected bit, wherein one of the first generating means and the second generating means generates one register number in each data transfer cycle for one register based on the position signal; and bit resetting means for resetting each detected bit in the latching means after the transferring means executes data transfer for one register in each data transferring cycle, wherein the bit detection means attempts detection of another valid bit in the latching means after each resetting operation and data transfer cycle until all valid bits from the latching means have been detected.

4. The information processing apparatus of claim 3, wherein the first generating means generates a register number of each register of the m registers which corresponds to a bit position in the single field indicated by the position signal.

5. The information processing apparatus of claim 4, wherein the second generating means includes:

group field determining means for determining whether the position signal shows a bit position of the group field in the latching means; and continuous generation means for generating, in sequence, one register number for each of the n registers of the register group in each data transfer cycle, when the group field determining means has determined that the bit position of the group field is shown.

6. The information processing apparatus of claim 5, wherein the second operand indicates a stack pointer pointing to the memory block which is a stack area and the transferring means performs data transfer between the registers having the register numbers generated by the first generating means and the second generating means and the stack area indicated by the stack pointer.

7. The information processing apparatus of claim 1, wherein the register set includes m+n registers, wherein the single field has m bits each corresponding to one of the m registers and the group field has at least two bits but less than n bits, wherein the second generating means successively generates register numbers corresponding to the register group of a predetermined plurality of registers from the group of the n registers, in accordance with a bit pattern of the group field, where m and n are integers.

8. The information processing apparatus of claim 7, wherein the determining means includes:

first latching means for latching the single field and the group field in the selected machine language instruction, wherein the single field is latched at a higher bit position than the group field;

second latching means for latching the group field in the selected machine language instruction;

bit detection means for detecting a first valid bit in the latching means starting from a most significant bit (MSB) side and for outputting to the first generating means or the second generating means a position signal showing a bit position of the detected bit, wherein the first generating means generates one register number in each data transfer cycle for one register based on the position signal and the second generating means generates one register number in each data transfer cycle for one register based on the position signal and contents of the second latching means; and bit resetting means for resetting each detected bit in the latching means after the transferring means executes data transfer for one register in each data transferring cycle, wherein the bit detection means attempts detection of another valid bit in the latching means after each resetting operation and data transfer cycle until all valid bits from the latching means have been detected.

9. The information processing apparatus of claim 8, wherein the first generating means generates a register number of each register of the m registers which corresponds to a bit position in the single field indicated by the position signal.

10. The information processing apparatus of claim 9, wherein the second generating means includes:

group field determining means for determining whether the position signal shows any bit position of the group field in the latching means; and continuous generation means for generating, in sequence, one register number in each data transfer cycle for one register out of the plurality of registers in the register group designated by the bit pattern in the second latching means, when the group field determining means has determined that a bit position in the group field has been shown.

11. The information processing apparatus of claim 10, wherein the second operand indicates a stack pointer pointing to the memory block which is a stack area and the transferring means performs data transfer between the registers having the register numbers generated by the first generating means and the second generating means and the stack area indicated by the stack pointer.

12. The information processing apparatus of claim 1,
wherein the selected machine language instruction indicates a calculation using data from a plurality of registers designated by the first operand and data in the memory block designated by the second operand, wherein the information processing apparatus further includes calculating means for executing the calculation indicated in the selected machine language instruction, and wherein the transferring means transfers a result of the calculation from the calculating means to one of the plurality of registers or the memory block.

13. An information processing apparatus for executing a program, the apparatus including:
- a register set having m registers used as non-destroyable registers necessary for storing data in a subroutine and n registers used as destroyable registers not necessary for storing data in a subroutine, wherein m and n are integers;
- decoding means for decoding machine language instructions in the program and extracting a selected machine language instruction,
- wherein the selected machine language instruction includes a first operand and a second operand and indicates data transfer between a plurality of registers from the register set designated by the first operand and a memory block designated by an effective address of the memory block stored in the second operand,
- wherein the first operand has a single field showing whether each register of the m registers is designated and a group field showing whether the n registers are designated as a register group, and the second operand designates an effective address of the memory block by using a stack pointer;
- wherein there are more registers in the register group than there are bits in the group field;
- determining means for determining whether each bit in the single field and in the group field of the first operand of the selected machine language instruction is valid;
- first generating means for generating a register number for each register corresponding to a bit in the single field determined as being valid;
- second generating means for generating, in order, a register number of each of the registers in the register set to which the group field relates, when a bit in the group field has been determined as being valid; and
- transferring means for executing data transfer between registers identified by the register numbers generated by the first generating means and the second generating means and consecutive memory areas starting form the effective address of the memory block.

14. The information processing apparatus of claim 13, wherein the selected machine language instruction includes a first transfer instruction for indicating data transfer from registers to the memory and a second transfer instruction for indicating data transfer from the memory to registers.

15. The information processing apparatus of claim 14, wherein the determining means includes:
- latching means for latching the single field and the group field in the selected machine language instruction, wherein the single field is latched at a higher bit position than the group field;
- bit detection means for detecting a first valid bit in the latching means starting from a most significant bit (MSB) side and for outputting to the first or second generating means a position signal showing a bit position of the detected bit, wherein one of the first generating means and the second generating means generates one register number in each data transfer cycle for one register based on the position signal; and
- bit resetting means for resetting, each detected bit in the latching means after the transferring means executes data transfer for one register in each data transferring cycle,
- wherein the bit detection means attempts detection of another valid bit in the latching means after each resetting operation and data transfer cycle until all valid bits from the latching means have been detected.

16. The information processing apparatus of claim 15, wherein the first generating means generates a register number of each register of the m registers which corresponds to a bit position in the single field indicated by the position signal.

17. The information processing apparatus of claim 15, wherein the second generating means includes:
- group field determining means for determining whether the position signal shows a bit position of the group field in the latching means; and
- continuous generation means for generating, in sequence, one register number for each of the n registers of the register group in each data transfer cycle, when the group field determining means has determined that the bit position of the group field is shown.

18. An information processing apparatus for executing a program from a memory, the apparatus including:
- a register set having a plurality of registers;
- decoding means for decoding machine language instructions in the program and extracting a selected machine language instruction,
- wherein the selected machine language instructions include at least a subroutine call instruction and a return instruction from a subroutine,
- wherein the selected machine language instructions include an operand which indicates a plurality of registers,
- wherein the selected machine language instructions indicate data transfer between the plurality of registers indicated by the operand and a stack in the memory, and
- wherein the operand has a single field of at least one bit which shows whether an individual register of the register set is designated and a group field which shows whether a plurality of registers of the register set which are not related to the single field are designated as a register group,
- wherein there are more registers in the register group than there are bits in the group field;
- determining means for determining whether each bit in the single field and in the group field of the operand of the selected machine language instruction is valid;
- first generating means for generating a register number for each register corresponding to a bit in the single field determined as being valid;
- second generating means for generating in order a register number of each of the registers in the register group to which the group field relates, when a bit in the group field has been determined as being valid; and
- transferring means for executing data transfer between registers identified by the register numbers generated by the first generating means and the second generating means, and the stack in the memory.

19. The information processing apparatus of claim 18, wherein the register set includes m+n registers, wherein the single field has m bits each corresponding to one of the m registers and the group field has one bit designating the n predetermined registers as the register group, wherein m and n are integers.

20. The information processing apparatus of claim 19, wherein the determining means includes:
- latching means for latching the single field and the group field in the selected machine language instruction, wherein the single field is latched at a higher bit position than the group field;

bit detection means for detecting a first valid bit in the latching means starting from a most significant bit (MSB) side and for outputting to the first or second generating means a position signal showing a bit position of the detected bit, wherein one of the first generating means and the second generating means generates one register number in each data transfer cycle for one register based on the position signal; and bit resetting means for resetting each detected bit in the latching means after the transferring means executes data transfer for one register in each data transferring cycle, wherein the bit detection means attempts detection of another valid bit in the latching means after each resetting operation and data transfer cycle until all valid bits from the latching means have been detected.

21. The information processing apparatus of claim 20, wherein the first generating means generates a register number of each register of the m registers which corresponds to a bit position in the single field indicated by the position signal.

22. The information processing apparatus of claim 20, wherein the second generating means includes:

group field determining means for determining whether the position signal shows a bit position of the group field in the latching means; and continuous generation means for generating, in sequence, one register number for each of the n registers of the register group in each data transfer cycle, when the group field determining means has determined that the bit position of the group field is shown.

23. An information processing unit having a set of registers and a memory, each said register having a machine language instruction format, comprising:

a first operand field having a single field and a group field, wherein the single field separately shows whether each register in a first predetermined group of registers of the set of registers is indicated, and the group field shows whether registers of a second predetermined group of registers of the set of registers are indicated as a register group, wherein there are more registers in the register group than there are bits in the group field;

a second operand field indicating an effective address in the memory; and an operation code field indicating data transfer between the plurality of registers indicated by the first operand field and the memory indicated by the second operand field.

24. The information processing unit of claim 23, wherein the first predetermined set of registers includes m registers which are used as non-destroyable registers necessary for storing data in a subroutine and the second predetermined set of registers includes n registers which are used as destroyable registers that are not necessary for storing data in a subroutine, wherein the single field has m bits which show whether each register from the first predetermined set of the m registers is designated and the group field has one bit which shows whether the n registers from the second predetermined set of registers are designated as a register group, wherein m and n are integers.

25. The information processing unit of claim 23, wherein the first predetermined set of registers includes m registers which are used as non-destroyable registers necessary for storing data in a subroutine and the second predetermined set of registers includes n registers which are used as destroyable registers that are not necessary for storing data in a subroutine, wherein the single field has m bits which show whether each register from the first predetermined set of the m registers is designated, and the group field has at least two bits but less than n bits and designates a predetermined plurality of registers from the group of the n registers, in accordance with a bit pattern of the group field, where m and n are integers.

* * * * *